United States Patent

Andreaco et al.

[11] Patent Number: 5,986,266
[45] Date of Patent: Nov. 16, 1999

[54] METHOD OF CALIBRATING MULTI-CRYSTAL SINGLE BLOCK RADIATION DETECTORS

[76] Inventors: Mark S. Andreaco, 1022 Lovell View Cir., Knoxville, Tenn. 37922; Joel G. Rogers, 2460 W.12th Avenue, Vancouver, British Columbia, Canada, V6K2P1

[21] Appl. No.: 08/940,015

[22] Filed: Sep. 29, 1997

Related U.S. Application Data

[63] Continuation of application No. 08/725,271, Oct. 2, 1996, abandoned, which is a continuation of application No. 08/332,707, Nov. 1, 1994, abandoned.

[51] Int. Cl.$^6$ .................... G01T 1/164; G01T 1/202
[52] U.S. Cl. .................. 250/363.09; 250/252.1; 250/367; 250/369
[58] Field of Search ............ 250/363.09, 363.07, 250/366, 369, 367, 252.1 R; 378/207

[56] References Cited

U.S. PATENT DOCUMENTS

| | | | |
|---|---|---|---|
| 4,223,221 | 9/1980 | Gambini et al. | 250/369 |
| 4,256,960 | 3/1981 | Snider | 250/252.1 |
| 4,424,446 | 1/1984 | Inbar et al. | 250/363.09 |
| 4,517,460 | 5/1985 | Meulenbrugge et al. | 250/252.1 |
| 5,171,986 | 12/1992 | Loomis et al. | 250/252.1 R |
| 5,227,634 | 7/1993 | Ryuo et al. | 250/367 |

FOREIGN PATENT DOCUMENTS 0091823  10/1983  European Pat. Off. ......... 250/363.09

OTHER PUBLICATIONS

"An Improved Multicrystal 2–D BGO Detector for PET", J.G. Rogers et al. IEEE Transactions on Nuclear Science, vol. 39, No. 4, pp. 1063–1068, 1992.

*Primary Examiner*—Constantine Hannaher
*Attorney, Agent, or Firm*—Griffin, Butler, Whisenhunt & Szipl, LLP

[57] ABSTRACT

A method of calibrating multi-crystal, single block radiation detectors for use in positron emission tomography and other devices with multi-crystal, single block radiation detectors that are used to determine gamma ray distribution. The detector units are individually subjected to a gamma ray flood source wherein the gamma ray has an energy in excess of about 0.7 MeV, and preferably above about 1.0 MeV. Energies of up to about 10 MeV are usable with the calibration method, with higher energies giving rise to containment and handling problems because of the energy. The light produced within each of the crystals is converted to electrical signals through, for example, photomultiplier tubes. These signals are used to generate a lookup map, this map providing information as to the correct positioning and response of each crystal in the array of crystals of the block detector. The method is useful for detector blocks of of many sizes that are divided into arrays of a large number of crystals.

10 Claims, 7 Drawing Sheets

METHOD OF CALIBRATING MULTI-CRYSTAL SINGLE BLOCK RADIATION DETECTORS

This application is a continuation of Ser. No. 08/725,271 filed Oct. 2, 1996, now abandoned, which in turn is a continuation of Ser. No. 08/332,707 filed on Nov. 1, 1994, now abandoned.

TECHNICAL FIELD

The present invention relates to a method for calibrating crystal-type radiation detectors, and more particularly to a method for calibrating a multi-crystal array formed from a single block of detector material. It is of particular use for the calibration of multi-crystal detectors utilized in positron emission tomography and like devices.

BACKGROUND ART

Current state-of-the art positron emission tomograph (PET) units employ a plurality of blocks of bismuth germanate, typically having array of a multiplicity of detector crystals. A multiplicity of these blocks are held in a gantry surrounding a volume into which items are inserted for analysis. Mounted to each of these blocks are an array of light-sensitive detectors, such as photomultiplier tubes (PMT). The use of reflectors between each of the crystals confines the light generated from a gamma ray interaction, and light guides control the distribution of light to the PMTs making it possible for each crystal to be identified by a unique set of PMT signal combinations.

In a normal utilization of the PET unit, a radiopharmaceutical is introduced into the subject for analysis such that positrons are created in the course of the decay of the radioactive isotope. Upon emission, the positron encounters an electron and both are annihilated. As a result of each annihilation, gamma rays are generated in the form of two photons. As is well known, these two photons are emitted in approximately opposite directions from one another. The precise position of the positron-emitting isotope can be determined by surveying these photons by determining the light output of the various crystal detectors in the gantry surrounding the object under study.

Prior to the initial use of a PET unit, the detectors thereof must be calibrated such that subsequent use can provide the needed accurate situs of the positrons. This is conventionally accomplished using a gamma-ray source of about 511 keV positioned within the unit such that the multi-crystals of a given detector block are substantially uniformly subjected to the radiation. Usually the detector units are operated in a coincidence manner in order to ascertain true radiation from the source in contrast, for example, to scattered radiation. Typically, the gamma-ray source is $^{68}$Ge having an energy of 511 keV. Other sources in this same range of energies are typically $^{22}$Na and $^{18}$F. The distance to the crystal faces is sufficiently large that the source can be considered a "flood source" in that the radiation is uniform across the face of the multi-crystal detector block. The output of the bank of PMT's is monitored to determine that the light output from the various crystals of the block is substantially uniform, and that there is uniformity between light output of each of the blocks. Such factors as orientation, cut depth, photomultiplier tube response, etc. can affect the uniformity. Of course, a PET unit might require periodic re-calibration of the detectors.

In an effort to obtain better spatial resolution of the situs of the origin of the positron, it has been proposed that block detectors could be modified by increasing the number of crystals per block to 144 (a 12×12 array) and 256 (a 16×16 array). This is thought to permit obtaining detection capabilities in smaller segments around the gantry. While such capabilities have been encouraging, when calibration was attempted using conventional methods, there was excessive deviation in light response across the detector face, particularly in the edge crystals.

Therefore, it is an object of the present invention to provide an improved method for the calibration of multi-crystal block radiation detectors wherein substantially uniform light output is achieved for all crystals of the block.

It is another object of the present invention to provide a method for the calibration of block radiation detectors having in excess of about 64 crystals per block whereby uniform light output is achieved for all crystals of the block when the block has been properly fabricated.

A further object of the present invention is to provide a method of calibrating multi-crystal block radiation detectors with a gamma ray energy in excess of about 0.7 meV.

These and other objects of the present invention will become apparent upon a consideration of the following detailed description of the invention when taken together with the illustrations within the figures.

DISCLOSURE OF THE INVENTION

In accordance with the present invention, multi-crystal block radiation detectors are calibrated using gamma ray radiation from a flood source wherein the gamma rays have an energy of from about 0.7 MeV to about 10 MeV. The upper limit of the energy is only limited by the difficulty of handling higher energy sources and by any radiation damage caused thereby to the detectors themselves. The gamma rays from the source are caused to impinge upon the face of individual of the block detectors, and the outputs of the PMTs are analyzed in a computer for evaluation of the radiation upon, and the light output from, the individual crystals. The method is applicable to all of the known and anticipated multi-crystal block detectors. As with the prior calibration methods, the orientation, cut accuracy and other manufacturing parameters can be checked by this method of high energy calibration.

BEST MODE FOR CARRYING OUT THE INVENTION

As a part of testing each tomograph, the response of each of the hundreds of detectors used for the tomograph are determined through a calibration procedure. This is accomplished by creating a "map" of each block detector's response to a known source of gamma rays, with these maps being stored in the computer prior to using the detectors for imaging. Typically the standard detectors (8×8 array of crystals) are calibrated by recording their response to a 511 keV flood source which uniformly and equally illuminates each of the detectors in the gantry of the tomograph. Because the statistical noise is less than the distance from one crystal to the next (i.e., the cut spacing), the flood spectrum of counts vs apparent x- and y-position shows sixty-four separated peaks which are assumed by a computer program to map to the actual positions of the crystals' centers.

Figure 1:
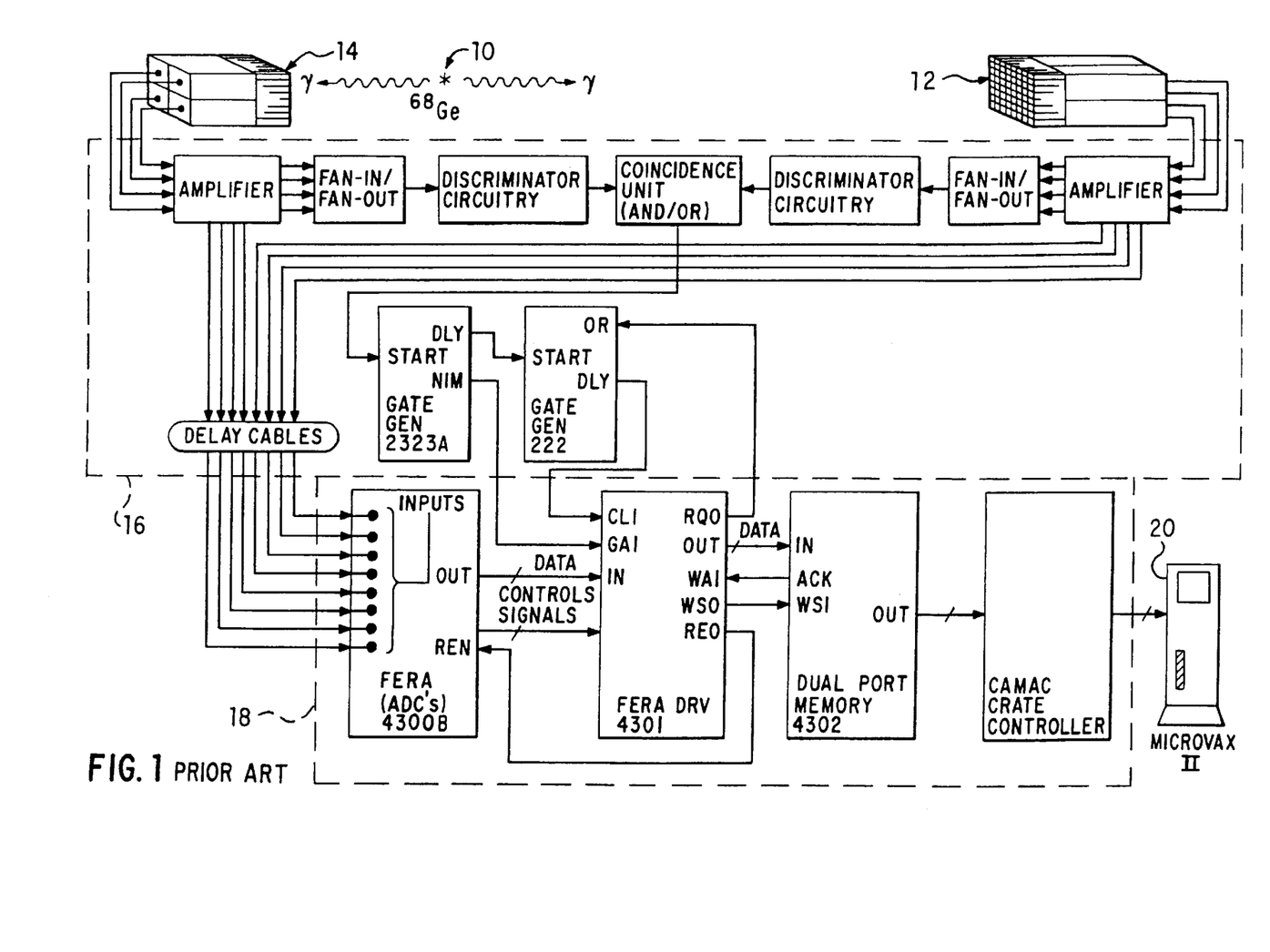
FIG. 1 is a circuit diagram showing components utilized in carrying out calibration of multi-crystal block detectors using gamma rays of 511 keV or their equivalents.

For a better understanding of the present invention, a brief description of the prior art method of calibrating single block, multi-crystal detectors follows. This prior art method has been used successfully to calibrate a detector block having an 8×8 array of crystals. Typical apparatus for this prior art method, and especially for evaluating the standard detectors against those that are improved (12×12 and 16×16 arrays) is illustrated in FIG. 1, this figure appearing in "An improved Multi-crystal 2-D BGO Detector for PET", J. G. Rogers, et al, Trans. Nucl. Sci., Vol. 39, p. 1063–1068 (1992). This illustrates the creation of a "flood" source by placing a point gamma source ($^{58}$Ge) 10 at a distance from the detector 12 under study such that the detector face is uniformly and equally illuminated. A "standard" detector 14 is used to ascertain coincidence of the gamma rays equivalent to the two gamma rays expected in operation of the tomograph, as well as to reduce possible scattered background from associated structure. Signal amplification and coincidence determination are achieved in conventional circuitry 16. Similarly, conventional circuitry 18 is utilized to create (after determining coincidence) a lookup map for storage in the computer 20. Details of using this apparatus are given in the above-cited reference which is incorporated herein by reference.

A lookup table is generated for each detector from its flood source response. The purpose is to assign every possible ($X_m$, $Y_m$) pair to one crystal so that no detected events are discarded. Each region in the lookup table is referred to as a "region of interest", or ROI. A polygon was chosen for the ROI's since they are easy to generate and yet flexible enough to bound the sixty-four peaks without discarding any events. The criterion for determining the "best" method was that the ROI boundaries follow valleys in the data set as closely as possible. These valleys correspond to the saw cuts used to form the crystals in the actual block. Thus the resultant map is a plurality of regions each of which contains the portion of the 2D array corresponding to gamma interactions in one of the small crystals of the block.

Figure 2:
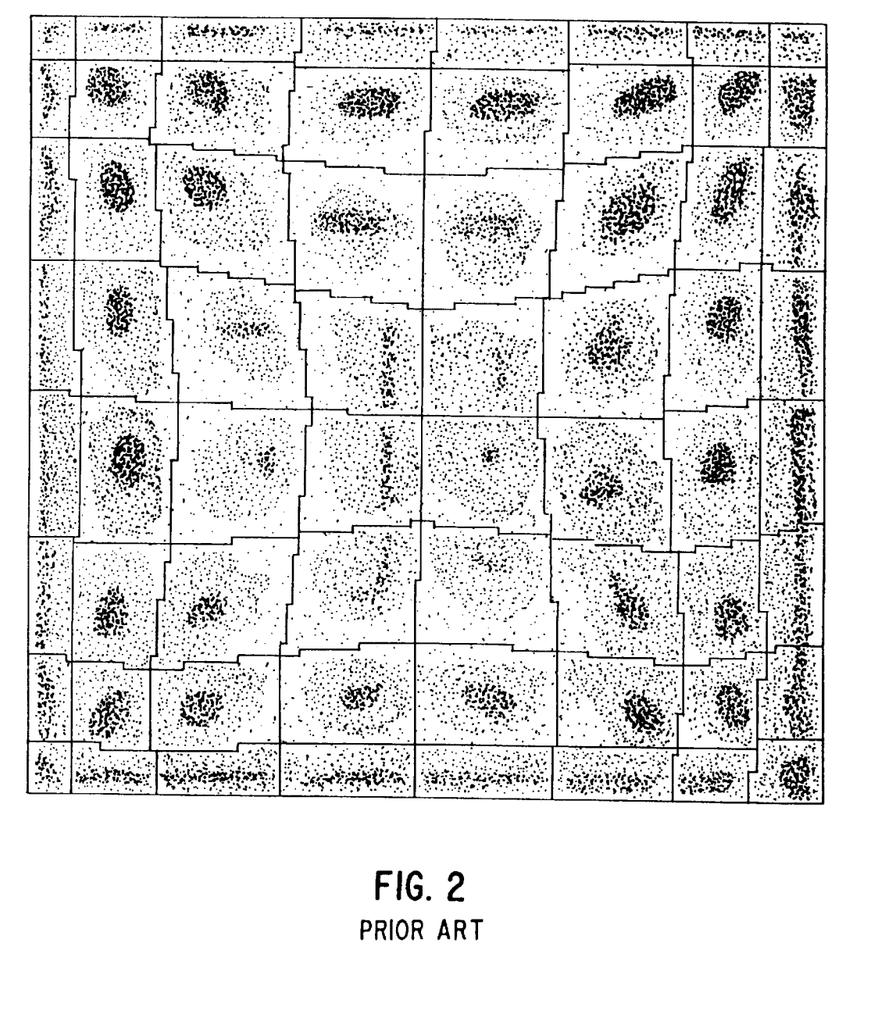
FIG. 2 is a typical "look-up" map for an 8×8 crystal array block detector using a calibration procedure of the prior art.

A typical lookup map for an 8×8 array, using the 511 keV gamma source, is shown in FIG. 2. This was achieved by acquiring about five million events by a data acquisition program. Each event was initially acquired as four 10-bit ADC words from the four PMT's of the detector being tested. These four words were reduced to x-position, y-position and total energy bytes which were finally stored in list-mode in a disk file to create the map. In this 2D display of FIG. 2, there are well separated peaks, and the sixty-four discrete peaks of the sixty-four crystals can be identified.

Figure 3:
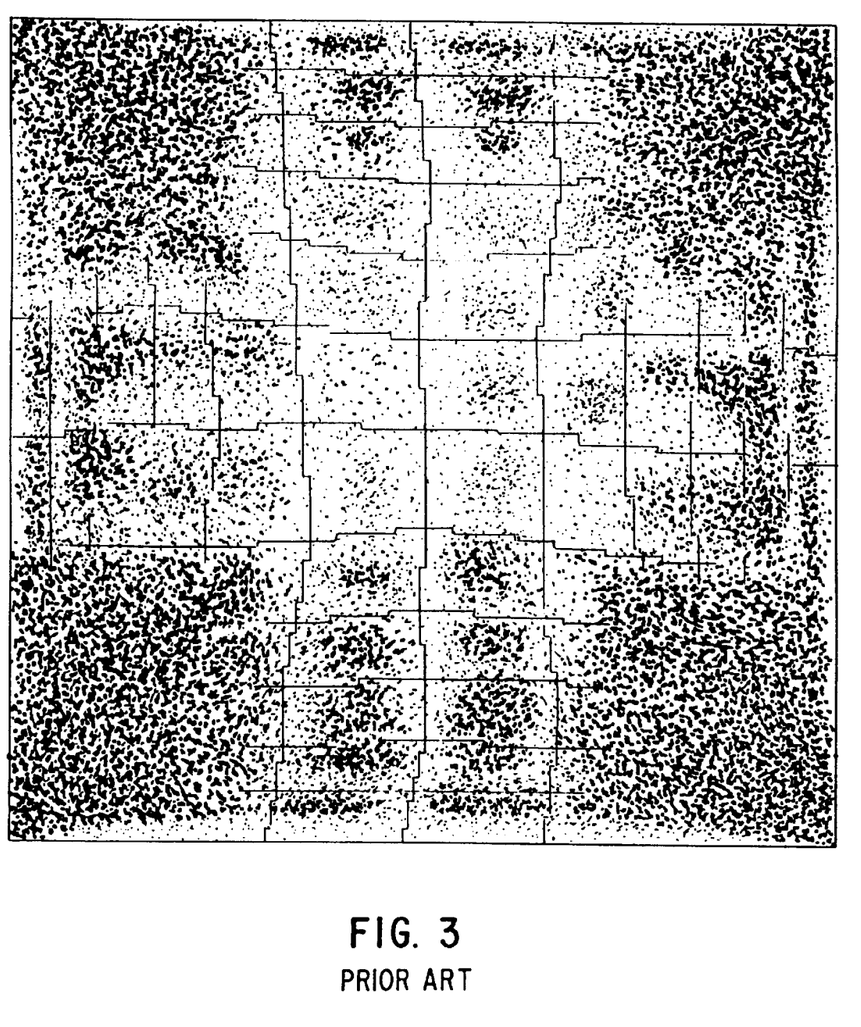
FIG. 3 illustrates the results obtained using a calibration method of the prior art (511 keV gamma rays) when attempting to calibrate 144 crystal detector blocks, which can be contrasted with the result for 64 crystal detector blocks (FIG. 2).

The same method of calibration using the 511 keV gamma source was utilized to determine a lookup map for a 12×12 crystal array detector (144 individual crystals), and for a 16×16 crystal array detector (256 individual crystals). The result for a 12×12 crystal array is shown in FIG. 3. In contrast to the results shown in FIG. 2, although there are well separated peaks in some regions of the 2D array, it is not possible to clearly identify the discrete peaks corresponding to the positions of the crystals which made up the blocks; i.e., the peaks tend to "run together". The result for a 16×16 array, although not shown, is even less discernable as to individual crystals.

Figure 4:
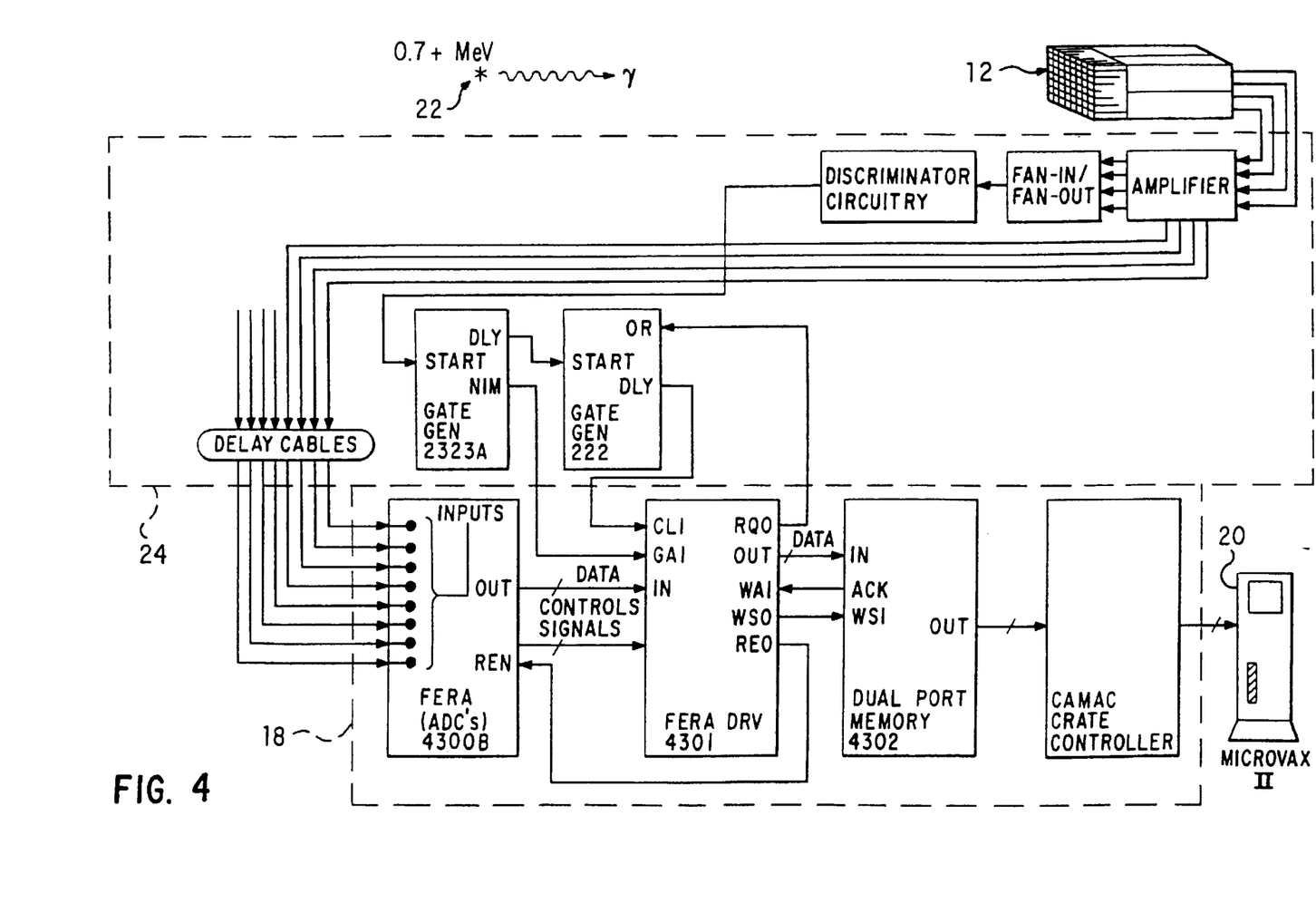
FIG. 4 is a circuit diagram showing components that are typically utilized in the carrying out of the high energy calibration of the present invention.

As a possible solution of the running together of the peaks when calibrating 144 and 256 crystal detector units, a study was conducted of the response to the detector block when subjected to radiation of a flood source of significantly higher energy. An arrangement for this is illustrated in FIG. 4. Specifically, a gamma flood source 22 of 4.44 MeV was obtained by positioning a one Curie Americium-Beryllium source on an axis and approximately 4 cm from the detector. Data acquisition was triggered by detection of single gamma rays above a threshold of approximately 0.7 MeV. The photopeak events were positioned in the same ADC channels as for the 511 keV acquisition described above, by reducing the gain of the four PMT amplifiers in circuits 24 by a constant factor of 0.511/4.44 (0.511/E for other sources of E energy). This reduction of amplifier gains, and the removal of the coincidence requirement were the only changes made to the acquisition electronics in adapting it from use with the 511 keV gamma to 4.44 MeV gamma. The results were inputted to the circuits 18 and computer 20 as before.

Figure 5:
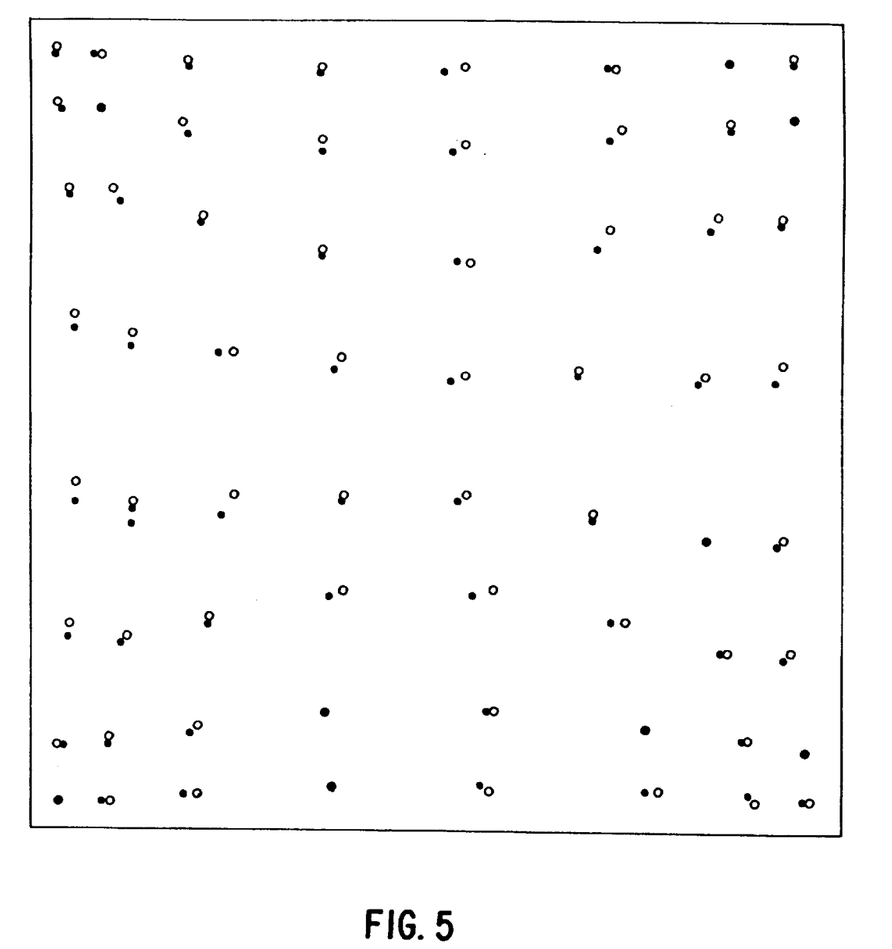
FIG. 5 illustrates the results of calibration, when using a 4.44 MeV gamma ray source, of a 8×8 crystal array, with a comparison with those for a 511 keV source.
Figure 6:
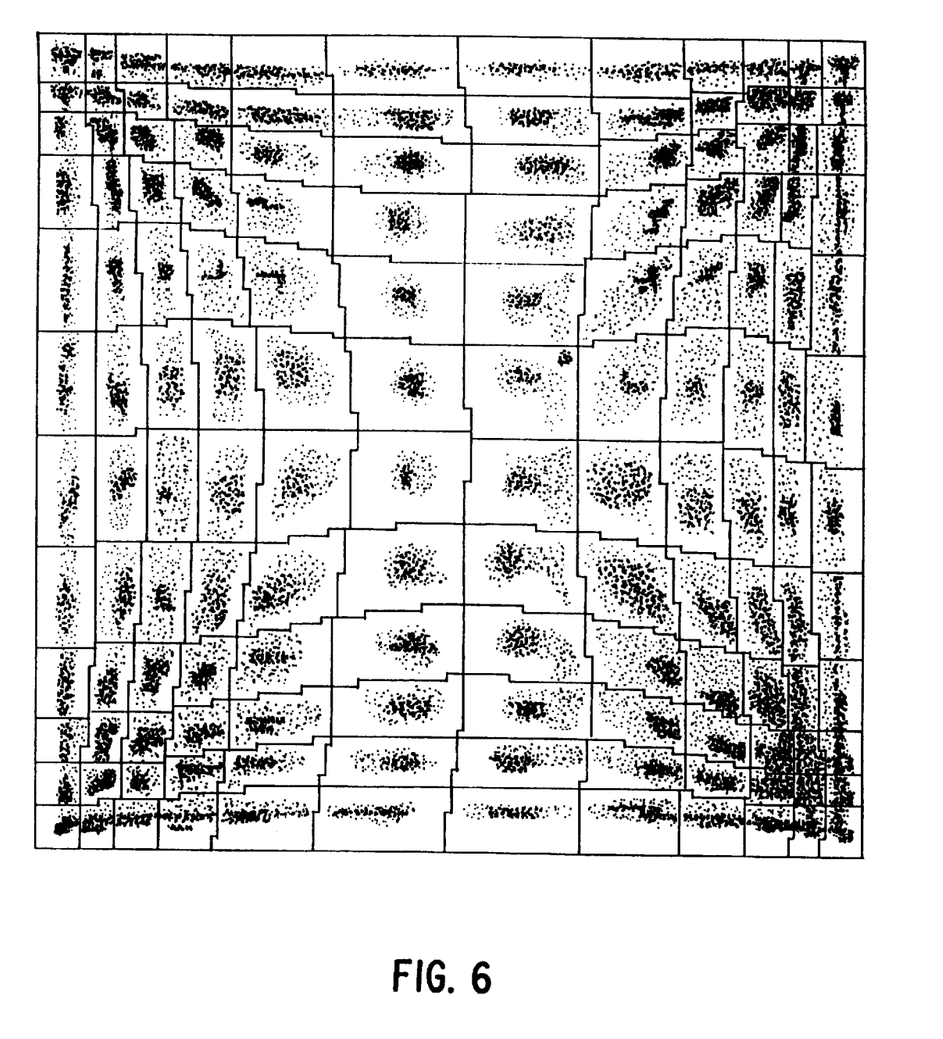
FIG. 6 illustrates the results of calibration, when using a 4.44 MeV gamma ray source, of a 12×12 crystal array.
Figure 7:
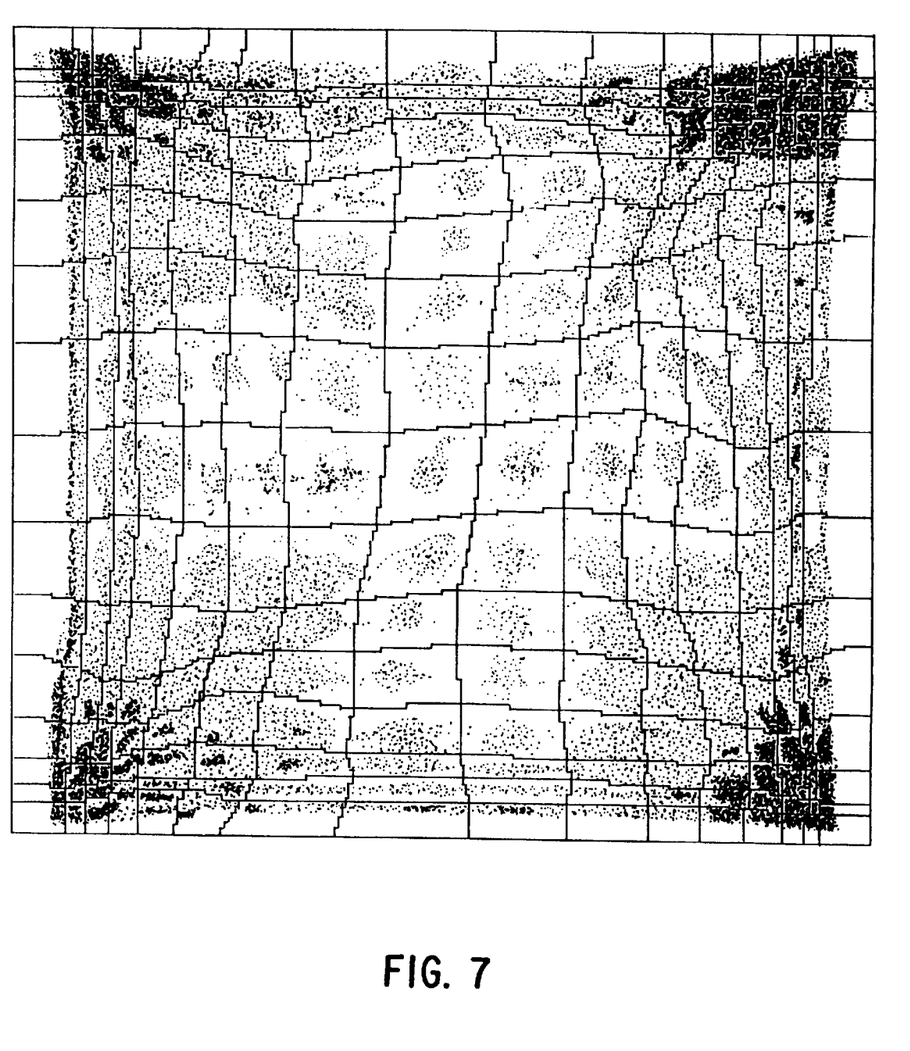
FIG. 7 illustrates the results of calibration, when using a 4.44 MeV gamma ray source, of a 16×16 crystal array.

Lookup maps for 8×8, 12×12 and 16×16 crystal arrays were created using the apparatus of FIG. 4. The results are shown in FIGS. 5–7, respectively. The lookup map of FIG. 5 shows a comparison between 511 keV and 4.44 MeV showing that the 4.44 MeV gamma ray flood source does not degrade the calibration of a 8×8 array detector when compared to a 511 keV source. In this figure the larger squares are for the 511 keV source. Further, by comparing FIG. 6 with that of FIG. 3, this lookup map for a 12×12 crystal array using the 4.44 MeV gamma source more accurately identifies the individual position of the 144 crystals of the block. Similarly, the lookup map for the 16×16 crystal array shown in FIG. 7 is improved over that of a calibration with 511 keV showing that calibration with a 4.44 MeV gamma flood source provides improved calibration (as contrasted to the use of a 511 keV source) of this detector block having a much larger number of crystals. The detector block for this test was an experimental unit such that some indicated displacement may be due to fabrication inaccuracies.

In view of the results obtained with the 4.44 MeV gamma source, where a threshold of 0.7 MeV was used in the electronics, it has been determined that any gamma source in excess of about the 0.7 MeV threshold will provide improved calibration of the multi-crystal block detectors wherein the number of crystals are in an array of about 12×12. For this purpose, one such higher energy source emits 1.2 MeV gamma ray, the source being cobalt-60 ($^{60}$Co). Another source that can be used is an Curium-Carbon source that produces a 6.13 MeV gamma ray, the source having a half-life of 421 years. In addition, more energetic gamma rays can be used, with the upper end of the energy bounded by a limitation on the handling and containment of the source, as well as any radiation damage to the various other equipment. Thus, from a practical standpoint, the present invention will use gamma rays having an energy from about 0.7 to about 10 MeV.

Having obtained a lookup map, the results thereof can be stored in the computer for future use with respect to the particular block detector. Such use might be, for example, in determining the situs of gamma ray(s) in a positron emission tomograph and like devices. Thus, the calibration data (from the lookup map) can be used to correct any data resulting from the use of the detector in some apparatus.

From the foregoing, it will be understood by persons skilled in the art that an improved calibration method has been developed for use with multi-crystal block radiation detectors wherein the number of crystals exceeds about sixty-four. Although actual testing of the method has utilized only 4.44 MeV gamma ray flood source, the results indicated that other gamma ray sources of generally greater than 0.7 MeV can be similarly used.

Although certain electronic circuits are illustrated herein, these are shown as an illustration of a typical utilization of the method of the invention. Thus, none of the equipment is recited to limit the invention. Rather, the invention is to be limited only by the appended claims and their equivalents.

We claim:

1. A method for calibrating a multi-crystal array, single block radiation detector for use in determining gamma ray position within a positron emission tomograph device using a gamma ray operating source of about 511 kev, the radiation detector having sufficient light-to-electric signal conversion units associated with the multi-crystal array whereby light output from each crystal of the array is distinguishable from light output in others of the crystals of the array, said method comprising:

irradiating the radiation detector with a gamma ray flood source of higher energy than the operating source to substantially equally irradiate all crystals of the array, the gamma ray flood source having a gamma ray energy selected from about 0.7 to about 10 MeV;

generating electrical signals, using the light-to-electric signal conversion units, corresponding to measured position values of light emission, $X_m$, $Y_m$, produced from each gamma ray detected in any of the crystals of the array;

electronically generating, using said electrical signals, a flood spectrum of counts as a function of the measured x- and y-position, which spectrum shows a multiplicity of peaks, one peak associated with each of the crystals in the array; and generating a 2D lookup map for the multi-crystal single block detector from its flood spectrum.

2. The method of claim 1 wherein said lookup map is a multi-region polygon with one region thereof associated with each crystal.

3. The method of claim 1 wherein said gamma ray flood source energy is in a range of about 1.2 MeV to about 6.13 MeV.

4. The method of claim 3 wherein said gamma ray flood source energy is about 4.44 MeV.

5. The method of claim 1 further comprising recording said lookup map for comparison with data obtained during use of the detector in the position emission tomograph device.

6. The method of claim 1, wherein the gamma ray flood source energy is in the range of about 1.2 to about 6.13 MeV and said lookup map is a polygon having a plurality of regions with each region associated with one of the crystals of the array.

7. The method of claim 6, wherein the gamma ray flood source energy is in the range of about 4.44 MeV.

8. The method of claim 1 wherein said gamma ray flood source energy is about 4.44 MeV.

9. A method for calibrating a multi-crystal array, single block radiation detector for use in determining gamma ray position within a tomographic imaging device, the radiation detector having sufficient light-to-electric signal conversion units associated with the multi-crystal array whereby light output from each crystal of the array is distinguishable from output in others of the crystals of the array, said method comprising:

irradiating the radiation detector with a gamma ray flood source to substantially equally irradiate all crystals of the array, the gamma ray flood source having a selected gamma ray energy significantly higher than the energy of gamma rays employed when the tomographic device is used for tomographic imaging;

generating electrical signals, using the light-to-electric signal conversion units, correspond to measured position values of light emission, $X_m$, $Y_m$, produced from each gamma ray detected in any of the crystals of the array;

electronically generating, using said electrical signals, a flood spectrum of counts as a function of the measured x- and y-positions, which spectrum shows a multiplicity of peaks, one peak associated with each of the crystals in the array; and generating a 2D lookup map for the multi-crystal single block detector from its flood spectrum.

10. The method of claim 9 wherein said tomographic imaging device is a PET camera, in which case the energy of gamma rays employed in operational tomographic imaging is 0.511 MeV.

* * * * *